(12) United States Patent
Binette

(10) Patent No.: US 7,803,861 B1
(45) Date of Patent: Sep. 28, 2010

(54) METHOD FOR FORMING A HIGHLY NEUTRALIZED POLYMER

(75) Inventor: Mark L. Binette, Ludlow, MA (US)

(73) Assignee: Callaway Golf Company, Carlsbad, CA (US)

( * ) Notice: Subject to any disclaimer, the term of this patent is extended or adjusted under 35 U.S.C. 154(b) by 496 days.

(21) Appl. No.: 11/859,975

(22) Filed: Sep. 24, 2007

Related U.S. Application Data

(60) Provisional application No. 60/826,785, filed on Sep. 25, 2006.

(51) Int. Cl.
*C08K 5/09* (2006.01)
*C08K 5/098* (2006.01)
*C08F 220/06* (2006.01)

(52) U.S. Cl. ............... 524/322; 524/394; 524/400; 525/88; 525/330.2

(58) Field of Classification Search ............... 524/322, 524/394, 400; 473/374; 525/88, 330.2
See application file for complete search history.

(56) References Cited

U.S. PATENT DOCUMENTS

| 6,815,480 B2 * | 11/2004 | Statz et al. | 524/322 |
| 6,953,820 B2 * | 10/2005 | Statz et al. | 524/322 |
| 2003/0198715 A1 * | 10/2003 | Morris et al. | 426/106 |
| 2006/0189733 A1 * | 8/2006 | Kennedy et al. | 524/322 |

* cited by examiner

*Primary Examiner*—Harold Y Pyon
*Assistant Examiner*—Michael Pepitone
(74) *Attorney, Agent, or Firm*—Michael A. Catania; Elaine H. Lo

(57) ABSTRACT

A method for forming highly neutralized polymers for use in games balls and the like is disclosed herein. The method includes mixing oleic acid with a predetermined amount of magnesium oxide which is greater than the amount necessary to fully neutralize the oleic acid. The over-neutralized oleic acid particulate is mixed with an acid copolymer compound to form a highly neutralized polymer.

2 Claims, No Drawings

METHOD FOR FORMING A HIGHLY NEUTRALIZED POLYMER

CROSS REFERENCES TO RELATED APPLICATIONS

The present application claims priority to U.S. Provisional Patent Application No. 60/826,785, filed on Sep. 25, 2006.

STATEMENT REGARDING FEDERALLY SPONSORED RESEARCH OR DEVELOPMENT

Not Applicable

BACKGROUND OF THE INVENTION

1. Field of the Invention

The present invention relates to a method for forming a highly neutralized polymer. More specifically, the present invention relates to a method for forming a highly neutralized polymer for use in a game ball.

2. Description of the Related Art

Currently, in forming highly neutralized polymers, a copolymer and fatty acid are mixed, and then a neutralization agent is added to the mixture. This is difficult since the fatty acid is liquid and the copolymer is in resin form. Thus, the reaction is time consuming.

BRIEF SUMMARY OF THE INVENTION

One aspect of the present invention is a method for forming a highly neutralized polymer. The method includes reacting a predetermined amount of a neutralization agent with a predetermined amount of a fatty acid to form an over-neutralized fatty acid compound, wherein the predetermined amount of the neutralization agent is greater than the amount necessary to fully neutralize the fatty acid. Next, a predetermined amount of an acid copolymer compound is reacted with the over-neutralized fatty acid compound to form a highly neutralized polymer.

Another aspect of the present invention is a method for forming a highly neutralized polymer, which beings with pouring a predetermined amount of oleic acid into a vessel. Next, a predetermined amount of magnesium oxide is added to the vessel. The predetermined amount of the magnesium oxide is greater than the amount necessary to fully neutralize the oleic acid. The oleic acid is mixed with the magnesium oxide within the vessel to form an over-neutralized oleic acid solid. Next, the over-neutralized oleic acid solid is ground to form an over-neutralized oleic acid particulate. Next, the over-neutralized oleic acid particulate is mixed with an acid copolymer compound to form a highly neutralized polymer.

Yet another aspect of the present invention is a method for forming a highly neutralized polymer by reacting a predetermined amount of magnesium hydroxide with a predetermined amount of an oleic acid to form an over-neutralized oleic acid compound. The predetermined amount of the magnesium oxide is greater than the amount necessary to fully neutralize the oleic acid. The method includes reacting a predetermined amount of an acid copolymer compound with the over-neutralized oleic acid compound to form a highly neutralized polymer.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

More particularly, the invention provides a neutralized thermoplastic material comprising a blend of (1) a copolymer comprising an alpha olefin and an alpha, beta-unsaturated carboxylic acid (an acid copolymer referred to as EX), (2) a copolymer of an alpha olefin and an alkyl acrylate (an alkyl acrylate copolymer referred to as EY) and 3) a fatty acid or salt of a fatty acid. The first copolymer may also include a softening comonomer such as an alkyl acrylate, which copolymer (or terpolymer) is referred to as EXY. Other materials, including but not limited to, urethanes and the like may be used to modify the blend The acid copolymer of a thermoplastic material of the invention may contain anywhere from 1 to 30% by weight acid. A high acid copolymer containing greater than 16% by weight acid, preferably, from about 17 to about 25 weight % acid and, more preferably, about 20 weight % acid, or a low acid copolymer containing 16% by weight acid or less may be used as desired. The acid copolymer is neutralized with a metal cation of a salt (a metal cation salt) capable of ionizing or neutralizing the copolymer to the extent desired, generally from about 10 to 100%, preferably, from 30 to 100% and, more preferably, from 40 to 90%. The amount of metal cation salt needed varies with the extent of neutralization desired.

The invention also provides a neutralized thermoplastic material comprising a blend of (1) a copolymer comprising an alpha olefin and an alpha, beta-unsaturated carboxylic acid (an acid copolymer referred to as EX), (2) a copolymer or plastomer comprising a metallocene-catalyzed alpha olefin and a softening comonomer, e.g., a metallocene-catalyzed ethylene/alpha olefin copolymer (a metallocene copolymer referred to as EM) and (3) a fatty acid or salt of a fatty acid. The first copolymer may also include a softening comonomer such as an alkyl acrylate, which copolymer (or terpolymer) is referred to as EXY. Other materials including, but not limited to, urethanes, and the like, may be used to modify the blend.

The acid copolymer of a thermoplastic material of the invention may contain anywhere from 1 to 30% by weight acid. A high acid copolymer containing greater than 16% by weight acid, preferably, from about 17 to about 25 weight % acid and, more preferably, about 20 weight % acid, or a low acid copolymer containing 16% by weight acid or less may be used as desired. The acid copolymer is neutralized with a metal cation of a salt (a metal cation salt) capable of ionizing or neutralizing the copolymer to the extent desired, generally from about 10 to 100%, preferably, from 30 to 100% and, more preferably, from 40 to 90%. The amount of metal cation salt needed varies with the extent of neutralization desired.

The acid copolymer is preferably made up of from about 10 to about 30% by weight of an alpha, beta-unsaturated carboxylic acid and an alpha olefin. Optionally, a softening comonomer can be included in the copolymer. Generally, the alpha olefin has from 2 to 10 carbon atoms and is, preferably, ethylene. The unsaturated carboxylic acid is an acid having from about 3 to 8 carbon atoms. Examples of such acids include, but are not limited to, acrylic acid, methacrylic acid, ethacrylic acid, chloroacrylic acid, crotonic acid, maleic acid, fumaric acid and itaconic acid, with acrylic acid and methacrylic acid being preferred. The optional softening comonomer, such as an alkyl acrylate, has, e.g., from 1 to 8 carbon atoms in the alkyl group. The acid copolymer broadly contains from 1 to about 30% by weight unsaturated carboxylic acid, from about 70 to about 99% by weight ethylene and from 0 to about 40% by weight of a softening comonomer.

Examples of acid copolymers suitable for use in a thermoplastic material of the invention include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/alkyl acrylate terpolymer, or an ethylene/acrylic acid/alkyl acrylate terpolymer.

Acid copolymers are well known in the golf ball art. Examples of acid copolymers that fulfill the criteria set forth above include, but are not limited to, those sold under the trade names Escor™ (ethylene/acrylic acid copolymers) and Iotek™ (ethylene/acrylic acid/acrylate terpolymers) by ExxonMobil, namely, Escor™ 959, Escor™ 960, Escor™ AT325 and Iotek™ 7510. Other examples of acid copolymers include those sold under the trade name Primacor™ (ethylene/acrylic acid copolymers) by Dow Chemical Company, namely Primacor™ 5980I and Primacor™ 3340I. Other acid copolymers that may be used include ethylene/methacrylic acid copolymers such as sold under the trade names Surlyn™ and Nucrel™ by DuPont. Surlyn™ copolymers are neutralized with zinc, sodium or lithium ions. Nucrel™ copolymers are inherently flexible like ethylene vinyl acetate (EVA) copolymers and offer desirable performance characteristics similar to those of Surlyn™ Nucrel™ copolymers are produced by reacting ethylene and methacrylic acid in the presence of free radical initiators. A branched, random ethylene/methacrylic acid (EMAA) copolymer is produced thereby. Carboxyl groups are distributed along the polymer chain and interact with carboxyl groups on adjacent molecules to form a weakly cross-linked network through hydrogen bonding. Nucrel™ and Surlyn™ terpolymers are also available for use in a thermoplastic material of the invention.

Acid copolymers of a thermoplastic material of the invention are neutralized to a desired percentage through the use of metal cation salts. The salts utilized are those that provide the metal cations capable of neutralizing, to various extents, the carboxylic acid groups of the acid copolymer. These salts include, for example, acetate, oxide or hydroxide salts of lithium, calcium, zinc, sodium, potassium, nickel, magnesium, aluminum, zirconium or manganese.

Some examples of salts comprising lithium cations are lithium hydroxide monohydrate, lithium hydroxide, lithium oxide and lithium acetate. Salts comprising calcium cations include calcium hydroxide, calcium acetate and calcium oxide. Suitable salts comprising zinc cations are zinc acetate dihydrate, zinc acetate or a blend of zinc oxide and acetic acid. Examples of salts comprising sodium cations include sodium hydroxide and sodium acetate. Similarly, salts comprising potassium cations include potassium hydroxide and potassium acetate. Suitable salts comprising nickel cations are nickel acetate, nickel oxide and nickel hydroxide. Salts comprising magnesium cations include magnesium oxide, magnesium hydroxide and magnesium acetate. Salts comprising manganese cations include manganese acetate and manganese oxide.

Generally, ethylene/alkyl acrylate copolymers include ethylene and acrylic or methacrylic esters of linear, branched or cyclic alkanols. Preferably, the copolymers contain from about 1 to about 35 weight % alkyl acrylate and from about 99 to about 65 weight % ethylene.

Examples of ethylene/alkyl acrylate copolymers that may be used include, among others, ethylene/ethyl acrylate (EEA), ethylene/methyl acrylate (EMA) and ethylene/butyl acrylate (EBA). EEA copolymers are made by the polymerization of ethylene units with randomly distributed ethylene acrylate (EA) monomer groups. The copolymers contain up to about 30% by weight of EA. The copolymers are tough and flexible having a relatively high molecular weight. The copolymers have good flexural fatigue and low temperature properties (down to −65° C.). In addition, EEA resists environmental stress cracking as well as ultraviolet (UV) radiation. Examples of EEA copolymers include those sold under the trade name Bakelite™ by the Union Carbide Corporation. EEA is similar to ethylene vinyl acetate (EVA) in its density-property relationships and high-temperature resistance. In addition, like EVA, EEA is not resistant to aliphatic and aromatic hydrocarbons.

EMA copolymers contain up to about 30% by weight of methyl acrylate and yield blown films having rubberlike limpness and high impact strength. These copolymers may be useful in coating and laminating applications as a result of their good adhesion to commonly used substrates. EMA also has good heat-seal characteristics.

EMA copolymers are manufactured by reacting, at high temperatures and pressures, methyl acrylate monomers with ethylene and free radical initiators. Polymerization occurs such that the methyl acrylate forms random pendant groups on the polyethylene backbone. The acrylic functionality decreases polymer crystallinity and increases polarity, enhancing polymer properties. These properties depend on molecular weight (determined, for example, by melt index) and percent crystallinity. Percent crystallinity is determined by the extent of methyl acrylate comonomer incorporation. As the methyl acrylate content increases, the film becomes softer, tougher and easier to heat seal.

EMA films have low moduli (generally less than 10,000 psi), low melting points and good impact strengths. In addition, EMA copolymers are highly polar and, as a result, are compatible with olefinic and other polymers. They adhere well to many substrates including low density polyethylene (LDPE), linear low density polyethylene (LLDPE) and EVA.

Examples of EMA copolymers for use in the golf ball components of the present invention include those sold under the trade names Optema™ or Escor™ by ExxonMobil. Optema™ and Escor™ are thermally stable polymers that will accept up to 65% or more fillers and pigments without losing their properties. These copolymers are more thermally stable than EVA and can be extruded or molded over a range of temperatures from 275 to 625° F. (compared to the limit of 450° F. for EVA copolymers). EMA copolymers are generally not corrosive as compared to EVA and EAA copolymers.

EBA copolymers can also be included in a thermoplastic material of the invention. These are generally similar to EMA copolymers with improved low temperature impact strength and high clarity. For example, the EBA copolymer sold under the trade name EBAC™ by the Chevron Corporation is stable at high temperatures and may be processed as high as 600° F.

Metal cation salts may also be utilized to neutralize ethylene/alkyl acrylate copolymers as a source of the corresponding carboxylic acid. The salts to be used are those salts that provide the metal cations capable of hydrolyzing and neutralizing, to various extents, the carboxylic acid ester groups of the copolymers. This converts the alkyl ester into a metal salt of the acid. These metal cation salts include, but are not limited to, oxide, carbonate or hydroxide salts of alkali metals such as lithium, sodium, potassium or mixtures thereof. Some examples hydroxide salts of alkali metals include, but are not limited to, lithium hydroxide monohydrate, lithium hydroxide, lithium carbonate, lithium oxide, sodium hydroxide, sodium oxide, sodium carbonate, potassium hydroxide, potassium oxide and potassium carbonate.

The acrylate ester is preferably an unsaturated monomer having from 1 to 21 carbon atoms, which serves as a softening comonomer. The acrylate ester preferably is methyl, ethyl, n-propyl, n-butyl, n-octyl, 2-ethylhexyl or 2-methoxyethyl 1-acrylate and most preferably is methyl acrylate or n-butyl acrylate. Another suitable type of softening comonomer is an alkyl vinyl ether selected from the group consisting of n-butyl, n-hexyl, 2-ethylhexyl and 2-methoxyethyl vinyl ethers.

The extent of neutralization can range from 10 to about 100%, preferably from about 30 to about 100% or, more preferably, from about 40 to about 90%. Generally, a higher degree of neutralization results in a harder and tougher thermoplastic material.

The metallocene-catalyzed copolymers or plastomers of a thermoplastic material of the invention include ethylene alpha olefin copolymers wherein the alpha olefin preferably has from 4 to 8 carbon atoms. Such plastomers are polyolefin copolymers developed using metallocene single-site catalyst technology. Polyethylene plastomers produced by metallocene single-site catalysis generally have better impact resistance than those made via Ziegler-Natta catalysis. Plastomers exhibit both thermoplastic and elastomeric characteristics. In addition to being comprised of a polyolefin such as ethylene, plastomers contain up to about 35 weight % softening comonomer. Plastomers of a thermoplastic material of the invention include, but are not limited to, ethylene/butene copolymers, ethylene/octene copolymers, ethylene/hexene copolymers, ethylene/hexene/butene terpolymers and mixtures thereof.

The plastomers included in a thermoplastic material of the invention may be formed by single-site metallocene catalysis such as disclosed in EP 0029358, U.S. Pat. Nos. 4,752,597, 4,808,561, and 4,937,299, the teachings of which are incorporated herein by reference. Blends of plastomers can also be used for the thermoplastic material. As is known in the art, plastomers can be produced by solution, shiny and gas phase processes, although preferred plastomers for a thermoplastic material of the invention are produced by metallocene catalysis. For example, a high pressure process can be used to polymerize ethylene in combination with other olefin monomers such as butene-1, hexene-1, octene-1 and 4-methyl-1-pentene in the presence of a catalyst system comprising a cyclopentadienyl-transition metal compound and an alumoxane.

Examples of plastomers that may be used in a thermoplastic material of the invention are those sold by ExxonMobil under the trade name Exact™, preferably, Exact™ 3024, Exact™ 3025, Exact™ 4049 and Exact™ 3027 (ethylene/butene copolymers). Other useful plastomers include, but are not limited to, ethylene/hexene copolymers such as Exact™ 3031.

Exact™ plastomers typically have a dispersion index ($M_w/M_n$, where $M_w$ is weight average molecular weight and $M_n$ is number average molecular weight) of about 1.5 to 4.0, a density of about 0.86 to about 0.93 g/cc, a melting point of about 140-220° F. and a melt index (MI) above about 0.5 g/10 mins. Plastomers that may be employed in a thermoplastic material of the invention include copolymers of ethylene and at least one $C_3$ to $C_{20}$ alpha olefin, preferably a $C_4$ to $C_8$ alpha olefin present in an amount of about 5 to about 32 weight %. Such plastomers are believed to have a composition distribution breadth index of about 45% or more.

The fatty acids and salts of fatty acids generally comprise fatty acids neutralized with metal cations. The fatty acids can be saturated or unsaturated fatty acids and are generally composed of a chain of alkyl groups containing from about 2 to about 80 carbon atoms, preferably from about 4 to about 30, usually an even number, and terminate with a carboxyl (—COOH) group. The general formula for fatty acids (except for acetic acid) is $CH_3(CH_2)_xCOOH$, wherein the carbon atom count includes the carboxyl group and X is from about 4 to about 30 carbon atoms. Examples of fatty acids suitable for use include, but are not limited to, stearic acid, oleic acid, palmitic acid, pelargonic acid, lauric acid, butyric acid, valeric acid, caproic acid, caprylic acid, capric acid, myristic acid, margaric acid, arachidic acid, behenic acid, lignoceric acid, cerotic acid, carboceric acid, montanic acid and melissic acid. Such fatty acids are preferably neutralized with metal cations such as zinc, calcium, magnesium, barium, sodium, lithium, aluminum or combinations thereof, although other metal cations may also be used. The metal cations are generally from metal cation salts that neutralize, to various extents, the carboxylic acid groups of the fatty acids. Examples of metal cation salts include sulfate, carbonate, acetate and hydroxylate salts of metals such as zinc, calcium, magnesium and barium. Examples of the fatty acid salts that may be utilized in a thermoplastic material of the invention include, but are not limited to, metal stearates, laureates, oleates, palmitates, pelargonates and the like such as zinc stearate, calcium stearate, magnesium stearate, barium stearate and so forth. Metal stearates are known in the art and are commercially available from various manufacturers.

In a preferred embodiment, the copolymers are blended in a Banbury™ type mixer, two-roll mill or extruder prior to neutralization. After blending, neutralization then occurs as the polymers are in a melt or molten state within the Banbury™ type mixer, two-roll mill or extruder. The blended composition is then formed into slabs, pellets or the like and maintained in such a state until molding is desired. Alternatively, a simple dry blend of the pelletized or granulated copolymers, which have previously been neutralized to a desired extent (and colored masterbatch, if desired) may be prepared and fed directly into the injection molding machine where homogenization occurs in the mixing section of the barrel prior to injection into the mold. If necessary, further additives such as inorganic fillers may be added and uniformly mixed in before initiation of the molding process.

The compatibility of a metallocene-catalyzed copolymer with an acid copolymer results in a thermoplastic material blend having superior properties over standard ionomeric resin blends as shown by the results provided in the Examples detailed below.

Additional materials may also be added to a thermoplastic material of the invention when utilized for golf equipment so long as such materials do not substantially reduce the playability properties of the equipment. Exemplary materials include dyes such as Ultramarine Blue™ sold by Whitaker, Clark & Daniels, Incorporated (see U.S. Pat. No. 4,679,795), pigments such as titanium dioxide, zinc oxide, barium sulfate and zinc sulfate, UV absorbers, antioxidants, antistatic agents, and stabilizers. Moreover, the ball cover compositions utilizing the thermoplastic material of the invention may also contain softening agents such as those disclosed in U.S. Pat. Nos. 5,312,857 and 5,306,760. Exemplary softeners include plasticizers, processing acids, and the like, and reinforcing materials such as glass fibers and inorganic fillers, as long as the desired properties of the golf ball produced are not impaired.

Various fillers may be added to golf ball compositions to reduce manufacturing costs, to increase or decrease weight, to reinforce the thermoplastic material, adjust ball layer density or flex modulus, aid in ball mold release and/or adjust the melt flow index of the thermoplastic material and the like.

Examples of heavy weight fillers include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, zirconium oxide) and metal stearates (such as zinc stearate, calcium stearate, barium stearate, lithium stearate and magnesium stearate). Other preferred fillers include limestone (ground calcium or magnesium carbonate) and ground flash filler.

Fillers that may be used in the layers of a golf ball (other than the outer cover layer) are typically in a finely divided form such as, for example, in a particle size generally less than about 20 U.S. standard mesh and, preferably, less than about 100 U.S. standard mesh (except for fibers and flock, which are generally elongated). Flock and fiber sizes should be small enough to facilitate processing. Filler particle size will depend upon the desired effect, cost, ease of addition and dusting considerations. A filler for a golf ball layer preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro-balloons and combinations thereof.

Most fillers except for metal stearates would be expected to reduce the melt flow index of an injection molded golf ball cover layer.

The amount of filler used in a golf ball layer is primarily a function of the weight and distribution requirements of the ball.

Fillers may be added to any or all layers of a golf ball. Such fillers may be used to adjust the properties of a golf ball layer, reinforce the layer or for any other purpose. In a thermoplastic material blend of the invention, reinforcing fillers may be used without detracting from or significantly reducing the coefficient of restitution (COR) of the material in a golf ball layer.

Together, the core 12 of the golf ball (and any optional core layers) and its cover layer 16 or layers 14 preferably combine to form a ball having a diameter of 1.680 inches or more, the minimum diameter permitted by the rules of the USGA, and weighing no more than 1.62 ounces for a regulation golf ball. Oversize golf balls may also be produced, if desired, using a thermoplastic material blend of the invention.

In another embodiment of the invention, the golf ball may be a one-piece or unitary construction golf ball comprising the blend of the invention. A thermoplastic material blend of the invention provides for a very durable golf ball. Such a golf ball may be painted or may have a clear coat or other markings if desired.

In a particularly preferred embodiment of the invention, the golf ball has a dimple pattern that provides coverage of 65% or more. The golf ball typically is coated with a durable, abrasion-resistant and relatively non-yellowing finish coat.

A golf ball and its components can be produced by molding processes that include, but are not limited to, those that are well known in the art. For example, golf ball components can be produced by injection molding, reaction injection molding, liquid injection and/or compression molding the partially to highly neutralized thermoplastic material blend of the invention as a golf ball core, core layer, cover layer and so forth. One or more layers of a golf ball may comprise the partially to highly neutralized blend according to the invention. Other layers of a golf ball may be made of the same or different materials and may comprise any suitable material or blend thereof known in the art.

The thermoplastic material of the invention preferably has a Shore D hardness of from about 30 to about 80 Shore D as desired. Additionally, a golf ball core, intermediate ball or finished ball may have a PGA compression of from about 0 to about 160.

After a golf ball has been molded, it may undergo various further processing steps such as buffing, painting and marking as disclosed in U.S. Pat. No. 4,911,451.

The present invention is further illustrated by the following examples in which the parts of the specific ingredients are by weight. It is to be understood that the present invention is not limited to the examples as various changes and modifications may be made to the invention without departing from the spirit and scope thereof.

In one embodiment, a golf ball 10 is constructed with a cover 16 composed of a polyurethane material as set forth in U.S. Pat. No. 6,117,024 from which pertinent parts are hereby incorporated by reference. The golf ball 10 has a core 12, a boundary layer 14 or both composed of a thermoplastic material of the present invention. The golf ball 10 preferably has a COR at 143 feet per second greater than 0.7964 and a USGA initial velocity less than 255.0 feet per second. The golf ball 10, more preferably, has a COR of approximately 0.8152 at 143 feet per second, and an initial velocity between 250 to 255 feet per second under USGA initial velocity conditions. A more thorough description of a high COR golf ball is disclosed in U.S. Pat. No. 6,443,858 from which pertinent parts are hereby incorporated by reference.

Additionally, the core of a golf ball 10 may be solid, hollow or filled with a fluid such as a gas or liquid. The golf ball can also have a metal mantle. The cover 16 of the golf ball 10 may be any suitable material. A preferred cover for a three-piece golf ball is composed of a thermoset polyurethane material. Alternatively, the cover 16 is composed of a thermoplastic polyurethane, ionomeric resin blend, ionomeric rubber blend, ionomeric resin, thermoplastic polyurethane blend or like. Alternatively, the golf ball 10 may have a thread layer. Those skilled in the pertinent art will recognize that other cover materials may be utilized without departing from the scope and spirit of the present invention. The golf ball 10 may have a finish of one or two base-coats and/or one or two top-coats.

In an alternative embodiment of a golf ball 10, the boundary layer 14 or cover layer 16 is comprised of a high acid (i.e., greater than 16 weight % acid) ionomeric resin or high acid ionomeric resin blend and the core 12 is composed of a thermoplastic material of the present invention. Alternatively, if the cover layer 16 is composed of a high acid ionomeric resin or a high acid ionomeric resin blend, then the boundary layer 14 and/or core 12 is composed of the thermoplastic material of the present invention. More preferably, the boundary layer 14 is comprised of a blend of two or more high acid (i.e., greater than 16 weight % acid) ionomeric resins neutralized, to various extents, by different metal cations.

In an alternative embodiment of a golf ball 10, the boundary layer 14 or cover layer 16 is comprised of a low acid (i.e., 16 weight % acid or less) ionomeric resin or low acid ionomeric resin blend. Preferably, the boundary layer 14 is comprised of a blend of two or more low acid (i.e., 16 weight % acid or less) ionomeric resins neutralized, to various extents, by different metal cations. The boundary layer 14 compositions of the embodiments described herein may include high acid ionomeric resins such as those developed by DuPont under the trade name Surlyn™, and by ExxonMobil under the Escor™ or Iotek™ trade names or blends thereof. Examples of compositions that may be used as the boundary layer 16 herein are set forth in detail in U.S. Pat. No. 5,688,869, which is incorporated herein by reference. Of course, such high acid ionomeric resin compositions are not limited in any way by those compositions set forth in U.S. Pat. No. 5,688,869. The compositions set forth in U.S. Pat. No. 5,688,869 are incorporated herein by way of example only.

High acid ionomeric resins that may be suitable for use in formulating the boundary layer 14 compositions are copolymers that are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the acid copolymer are partially neutralized (for example, approximately 10 to 100%, preferably, 30 to 70%) by the metal cations. Each of the high acid ionomeric resins that may be included in the inner layer components of a golf ball (components, for example, composed in part of a thermoplastic material of the invention) contains greater than 16% by weight of a carboxylic acid, preferably from about 17 to about 25% by weight of a carboxylic acid and, more preferably from about 18.5 to about 21.5% by weight of a carboxylic acid. Examples of high acid methacrylic acid ionomeric resins found suitable for use in accordance with the present invention include, but are not limited to, Surlyn™ 8220 and 8240 (both formerly known as forms of Surlyn™ AD-8422), Surlyn™ 9220 (zinc cation), Surlyn™ SEP-503-1 (zinc cation) and Surlyn™SEP-503-2 (magnesium cation). According to DuPont, all of these ionomeric resins contain from about 18.5 to about 21.5% by weight methacrylic acid. Examples of high acid acrylic acid ionomeric resins suitable for use in the present invention also include, but are not limited to, the high acid ethylene/acrylic acid copolymers produced by Exxon-Mobil such as Ex™ 1001, 1002, 959, 960, 989, 990, 1003, 1004, 993 and 994. Moreover, Escor™ or Iotek™ 959 are also copolymers that can be used with the present invention. According to ExxonMobil, Iotek™ 959 and 960 contain from about 19.0 to about 21.0% by weight acrylic acid with approximately 30 to about 70% of the acid groups neutralized with sodium and zinc cations, respectively.

Another embodiment of a boundary layer 14 of a golf ball can comprise non-ionomeric thermoplastic material or thermoset materials. Suitable non-ionomeric materials include, but are not limited to, metallocene-catalyzed polyolefins or polyamides, metallocene-catalyzed polyamide/ionomeric resin blends, polyphenylene ether/ionomeric resin blends, etc., which preferably have a Shore D hardness of at least 60 (or a Shore C hardness of at least about 90) and a flex modulus of greater than about 30,000 psi, preferably, greater than about 50,000 psi, or other hardness and flex modulus values that are comparable to the properties of the ionomeric resins described above.

Additional materials suitable for use in the boundary layer 14 or cover layer 16 of a golf ball as set forth herein include polyurethanes, which are described in more detail below.

In one embodiment, the cover layer 16 is comprised of a relatively soft, low flex modulus (about 500 to about 50,000 psi, preferably about 1,000 to about 25,000 psi, and more preferably about 5,000 to about 20,000 psi) material or blend of materials. Preferably, the cover layer 16 comprises a polyurethane, a polyurea, a blend of two or more polyurethanes/polyureas or a blend of one or more ionomeric resins or non-ionomeric thermoplastic materials with a polyurethane/polyurea. More preferably, the cover layer comprises a thermoplastic polyurethane or a reaction injection molded polyurethane/polyurea as described in more detail below.

The cover layer 16 preferably has a thickness in the range of 0.005 to about 0.15 inch, more preferably about 0.010 to about 0.050 inch and most preferably 0.015 to 0.025 inch. In one embodiment, the cover layer 14 has a Shore D hardness of 60 or less (or a Shore C hardness less than 90) and more preferably 55 or less (or a Shore C hardness of about 80 or less). In another preferred embodiment, the cover layer 16 is comparatively harder than the boundary layer 14.

In one preferred embodiment, the cover layer 16 comprises a polyurethane, a polyurea or a blend of polyurethanes/polyureas. Polyurethanes are polymers that are used to form a broad range of products. These polymers are generally formed by mixing two primary ingredients during processing. For the most commonly used polyurethanes, the two primary ingredients are a polyisocyanate (for example, 4,4'-diphenylmethane diisocyanate monomer, MDI, toluene diisocyanate, TDI, or derivatives thereof) and a polyol (for example, a polyester polyol or a polyether polyol).

A wide range of combinations of polyisocyanates and polyols (as well as other ingredients) are available for yielding polyurethanes such as described above. Furthermore, the properties of polyurethanes can be controlled by the types of ingredients used. For example, a polyurethane can be a thermoset type (a cross-linked molecular structure that is generally not flowable with heat) or thermoplastic type (a linear molecular structure that is generally flowable with heat).

Cross-linking of a thermoset polyurethane can occur between isocyanate groups (NCO) and the hydroxyl endgroups of polyols. Cross-linking will also occur between $NH_2$ groups of the amines and NCO groups of the isocyanates to form a polyurea. Additionally, the characteristics of such polyurethanes as described above can also be controlled by different types of reactive chemicals and processing parameters. For example, catalysts can be used to control polymerization rates. Depending on the processing method employed, polymerization rates can be very quick (as in the case for some reaction injection molding, RIM, systems) or may be on the order of several hours (as in several coating systems such as a cast system). Consequently, a great variety of polyurethanes are suitable for different end-uses.

Polyurethanes are typically classified as thermosetting or thermoplastic materials. A polyurethane becomes irreversibly "set" when a polyurethane prepolymer is cross-linked with a polyfunctional curing agent such as a polyamine or a polyol. The prepolymer typically is made from polyether or polyester. A prepolymer is typically an isocyanate-terminated polymer that is produced by reacting an isocyanate with a moiety that has active hydrogen groups such as a polyester and/or polyether polyol. For example, the moiety can be a hydroxyl group. Diisocyanate polyethers are the preferred polyurethanes set forth herein because of their water resistance.

The physical properties of thermoset polyurethanes are controlled substantially by the degree of cross-linking and by the content of hard and soft segments. Tightly cross-linked polyurethanes are fairly rigid and strong. A lower amount of cross-linking results in materials that are flexible and resilient. Thermoplastic polyurethanes have some cross-linking, although such cross-linking is primarily by physical means, for example, hydrogen bonding. Cross-linking bonds of a thermoplastic polyurethane can be reversibly broken by increasing temperatures such as during molding or extrusion. In this regard, thermoplastic polyurethanes can be injection molded and extruded as a sheet or blow film. Thermoplastic polyurethanes can be used up to about 400° F. and are available in a wide range of hardnesses.

Polyurethane materials suitable for use with the present invention may be formed by the reaction of a polyisocyanate, a polyol and, optionally, one or more polymer chain extenders. The polyol component can include any suitable polyether or polyester polyol. Additionally, in an alternative embodiment, the polyol component is polybutadiene diol. The polymer chain extenders include, but are not limited to, diols, triols and amine extenders. Any suitable polyisocyanate may be used to form a polyurethane as set forth herein. The polyisocyanate is preferably selected from the group of diisocyanates including, but not limited to, MDI, 2,4-TDI, m-xylylene diisocyanate (XDI), methylene bis-(4-cyclohexyl isocyanate) (HMDI), hexamethylene diisocyanate (HDI), naphthalene-1,5,-diisocyanate (NDI), 3,3'-dimethyl-4,4'-biphenyl diisocyanate (TODI), 1,4-diisocyanate benzene (PPDI), phenylene-1,4-diisocyanate and 2,2,4- or 2,4,4-trimethyl hexamethylene diisocyanate (TMDI).

Other less preferred diisocyanates include, but are not limited to, isophorone diisocyanate (IPDI), 1,4-cyclohexyl diisocyanate (CHDI), diphenylether-4,4'-diisocyanate, p,p'-diphenyl diisocyanate, lysine diisocyanate (LDI), 1,3-bis (isocyanato methyl)cyclohexane and polymethylene polyphenyl isocyanate (PMDI).

One additional polyurethane component that can also be used incorporates meta-tetramethylxylylene diisocyanate (TMXDI) aliphatic isocyanate. Polyurethanes based on TMXDI aliphatic isocyanate can provide improved gloss retention UV light stability, thermal stability and hydrolytic stability. Additionally, TMXDI aliphatic isocyanate has demonstrated favorable toxicological properties. Furthermore, given that TMXDI aliphatic isocyanate has a low viscosity, it is usable with a wider range of diols (to polyurethane) and diamines (to polyureas). If TMXDI aliphatic isocyanate is used, it typically (although not necessarily) can be added as a direct replacement for some or all of the other aliphatic isocyanates. Because of the slow reactivity of TMXDI aliphatic isocyanate, it may be useful or necessary to use catalysts in order to achieve practical demolding times. Hardness, tensile strength and elongation can be adjusted by adding further materials to such a polyurethane component.

The surface geometry of a golf ball 10 is preferably a conventional dimple pattern such as disclosed in U.S. Pat. No. 6,213,898 from which pertinent parts are hereby incorporated by reference. Alternatively, the surface geometry of the golf ball 10 may have a non-dimple pattern such as disclosed in U.S. Pat. No. 6,290,615 from which pertinent parts are hereby incorporated by reference.

EXAMPLES

Forming Magnesium Oleate

In a first example of making magnesium oleate, 400 grams of $H_2O$ was added to 250 grams of oleic acid and 25 grams of $Mg(OH)_2$. The components were stirred in a mixer and within one minute a white paste was formed. In a second example, 100 parts oleic acid was added to 13.4 parts of $Mg(OH)_2$. In a third example, 100 parts oleic acid was added to 10.3 parts of $Mg(OH)_2$ with a small amount of water resulting in a reaction time of four minutes. In a fourth example, 100 parts oleic acid was added to 10.3 parts of $Mg(OH)_2$ with 40 parts barium sulfate. In a fifth example 100 parts oleic acid was added to 15.3 parts of $Mg(OH)_2$ for over neutralization. In a sixth example, 100 parts oleic acid was added to 14 parts of $Mg(OH)_2$ with 40 parts barium sulfate. In an seventh example, 800 grams of oleic acid (100 parts), was mixed with 77.36 grams of magnesium oxide (9.67 parts).

A PRIOLENE 6910 in an amount of 100 parts was also mixed with 14 parts $Mg(OH)_2$.

The magnesium oleate was chopped into wedge type blocks and placed into the mixer for pulverizing. Water was run through the mixer to maintain the low temperature.

Forming highly neutralized polymer material.

In a first example, 50 parts NUCREL 2806, 50 parts EXACT 5361, 75.71 parts magnesium oleate and 0.2 parts BENOX 1010 were mixed and then extruded through an extruder at a feed rate of 0.7 at temperatures of 270° F., 425° F., 430° F., 420° F. and 410° F. The torque was 21. The process went well.

In a second example, 50 parts NUCREL 2806, 50 parts LOTRYL 35BA40, 75.71 parts magnesium oleate and 0.2 parts BENOX 1010 were mixed and then extruded through an extruder at temperatures of 470° F., In a third example, a bulk amount of magnesium oleate was utilized to form the polymer material. 30 parts NUCREL 2806, 70 parts AT325, 76 parts magnesium oleate, 1.4 parts $Mg(OH)_2$, and 0.2 parts BENOX 1010 were mixed and then extruded through an extruder.

In a fourth example, 50 parts NUCREL 2806, 50 parts EXACT 5361, 76 parts magnesium oleate, 1.2 parts $Mg(OH)_2$, and 0.2 parts BENOX 1010 were mixed and then extruded through an extruder.

In a fifth example, 50 parts NUCREL 2806, 50 parts LOTRYL 29MA03, 76 parts magnesium oleate, 1.2 parts $Mg(OH)_2$, and 0.2 parts BENOX 1010 were mixed and then extruded through an extruder.

In a sixth example, the PRIOLENE 6910 version of magnesium oleate was utilized to form the polymer material. 30 parts NUCREL 2806, 70 parts AT325, 102.72 parts magnesium oleate, 1.4 parts $Mg(OH)_2$, and 0.2 parts BENOX 1010 were mixed and then extruded through an extruder.

In a seventh example, the PRIOLENE 6910 version of magnesium oleate was utilized to form the polymer material. 50 parts NUCREL 2806, 50 parts EXACT 5361, 76 parts magnesium oleate, 1.4 parts $Mg(OH)_2$, and 0.2 parts BENOX 1010 were mixed and then extruded through an extruder.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A method for forming a highly neutralized polymer, the method comprising:

reacting a predetermined amount of magnesium hydroxide with a predetermined amount of an oleic acid to form an magnesium oleate compound, wherein the predetermined amount of the magnesium oxide is greater than the amount necessary to fully neutralize the oleic acid; and reacting a 50 parts of an ethylene acrylic acid, 50 parts of a plastomer, 76 parts of the of the magnesium oleate compound, and 1.2 parts of magnesium hydroxide to form a highly neutralized polymer.

2. The method according to claim 1 wherein the highly neutralized polymer has a neutralization ranging from 85% to 100%.

* * * * *